3,306,883
COATING COMPOSITION
Abraham Ravve, Chicago, and Joseph T. Khamis, Brookfield, Ill., assignors to Continental Can Company, Inc., New York, N.Y., a corporation of New York
Filed June 3, 1964, Ser. No. 372,352
14 Claims. (Cl. 260—78.5)

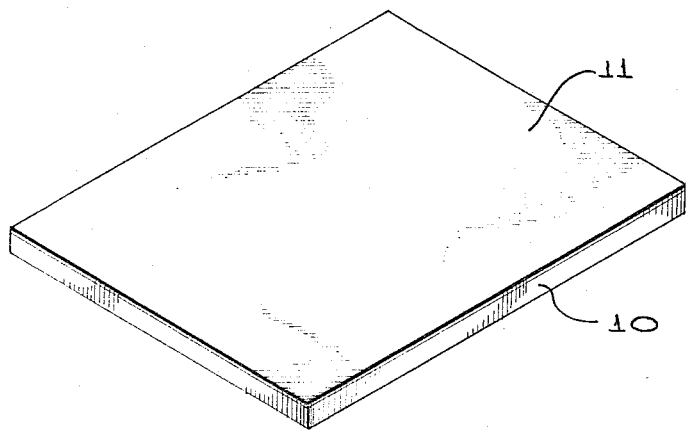
INVENTORS
ABRAHAM RAVVE &
JOSEPH T. KHAMIS

United States Patent Office 3,306,883
Patented Feb. 28, 1967

This invention concerns the preparation of coating compositions and the product thereof, consisting of the cross-linked product of an interpolymer and a cross-linking organic acid. The interpolymer is formed by interpolymerizing a styrene and/or an alkyl methacrylate with a glycidyl ester of an acrylic acid and an unsaturated ester.

This application is a continuation-in-part of our pending applications Ser. No. 100,499, filed April 4, 1961, now abandoned, and Ser. No. 162,738, filed December 28, 1961, now abandoned.

It is known to produce substances of complex molecular form by copolymerizing mono- and bi-functional compounds. When such substances are to be employed, for example in coating metals, the behavior during fabrication and use is highly important. The coating must adhere even under the most stringent conditions of intended employment; it must withstand the operations of forming the substrate to a desired shape; it must resist attack by materials which will normally come in contact with it; and when used for food containers, it must not cause deterioration of the foodstuff.

The prior art discloses the production of various polymer chains which have epoxy-group-containing side branches pendant to the main backbone chain thereof. Such polymers are formed from various copolymerizable monomers and have the general utility of cross-linking with epoxy reactive substances, such as polyfunctional primary and secondary amines, dibasic acids or acid anhydrides, polyhydroxy compounds (in acid medium), cyclic aliphatic amines, tertiary amines and aromatic amines. The various cross-linking substances have varying reactivity to pendant epoxy groups but all have great enough reaction rates at room temperatures to gel or cross-link rather rapidly when in a mixture with the epoxy containing polymer. A disadvantage of such great reactivity is that the cross-linking component may not be added to the epoxy containing polymer and stored prior to use, but must be mixed therewith at the site of the curing and in the desired position. This mixing just prior to application then requires two separate packages or containers for the material with raised packaging and shipping costs. Also, the pot-life of the thermosetting composition when mixed up is low; therefore, it is necessary to immediately flush out the applicator device so that the resin will not set up therein and prevent later use. These numerous disadvantages show that high reactivity rate at all temperatures and times is not always a desirable feature.

A major commercial limitation to the employment of thermoset coatings which depend upon epoxy group reactions to attain the thermosetting state has been the poor weathering characteristics of such coatings. Thus, the epoxy thermosetting coatings have been used for primer coats on vehicular body panels and other outdoor applications but are not useful for the surface finishes due to this poor weathering characteristic. An adequate theoretical basis for such poor weathering has not been advanced to date. While the prior epoxy based thermosetting coatings have not been available for uses where the coated substrate is exposed to weathering conditions, the material of the present invention is capable of outdoor employment. The degradation of the prior art epoxy based coatings upon bombardment by ultra-violet radiation present in sunlight has not been found to occur with the material of the present invention.

Another disadvantage with many of the epoxy-containing backbone polymer and acidic cross-linking agent mixtures is that normally employed pigmenting materials are not compatible therewith. This effect is believed to be due to the solubility of the cross-linking materials in the liquid media used to suspend and/or dissolve the components of the thermosetting composition. Such solubility of the acidic cross-linking agents permits an interaction with many of the pigmenting materials which are basic with respect to such cross-linking agents. A general result of such interaction and/or other combinations of the pigmenting materials prior to the curing of the thermosetting composition is that the coatings produced therefrom tend to be thixotropic and chalky. Thus, many of such systems are only capable of producing clear or translucent coatings devoid of colors. This is a serious drawback in many commercial applications where customer acceptance depends upon colorful surfaces combined with desirable service properties. In order to attain this customer acceptance, it is necessary that the surface have a glossy surface appearance. This is particularly true for applications such as food container exterior coatings, household articles, appliances, structural modules, vehicle body panels, and other outdoor fixtures. Many of the thermosetting compositions of the prior art of this type are unable to be employed successfully with pigments and, where pigments are compatible with these resin systems, most do not allow the formation of surface gloss appearances in the finally cured resin coatings. Other more expensive epoxy systems, such as the amine cured epoxy thermosetting coatings, do allow pigmenting and coloring with various dyes.

Another serious limitation with the prior art from a commercial standpoint is that the epoxy containing polymer and/or the cross-linking agent employed are seriously degraded by temperatures in excess of temperatures in the neighborhood of 400 to 500° F. Thus, temperatures in this range or above cannot be employed to effect a quick curing of the resin system. But rather, lower temperatures and, therefore, longer curing times are employed. It is extremely important that, for large volume application, the thermosetting resin systems contain components which are heat stable to high temperatures so that rapid curing can be effected.

It is, therefore, an object of this invention to provide a pendant epoxy group containing interpolymer which can be cross-linked by a special group of polycarboxylic acids and which may be dispersed in a volatile organic dispersant in which the cross-linking substances are insoluble to thereby render the total thermosetting composition totally unreactive at room temperature. This thermosetting composition when elevated to a sufficient temperature, allows the solubility of the cross-linking substance to disperse the same for reaction with the pendant epoxy containing groups. The non-reactivity at room temperatures for the total thermosetting composition identifies a long shelf life and pot life which materially increase the commercial desirability of employing such thermosetting compositions.

It is another object of the present invention to provide a thermosetting resin composition consisting of an epoxy group containing polymer and a cross-linking substance therefore dispersed in a volatile inert organic dispersant, together with a pigmenting material which when baked to a thermoset state, has a glossy and smooth surface finish. The incorporation of pigment materials together with good metal wetting characteristics allows the thermosetting resin system to be employed for functional and decorative coatings upon metal articles which have good customer appeal and, therefore, enhance commercial acceptability.

Another object of the present invention is to provide a thermosetting resin system which may be cured at temperatures in excess of 500° F. in very short times. The higher curing temperatures are workable due to the great heat stability of the components of the thermosetting resin system. The higher temperatures quickly volatilize and drive out the volatile inert organic dispersant and cross-link the epoxy group containing polymer in times less than one minute. For such quick curing temperatures in the range of 700 to 900° F. may be employed.

Yet another object of the present invention is to provide a thermosetting resin system which has good metal wetting properties and, when baked, provides a highly flexible coating layer for an underlying metal substrate and is greatly adhesive thereto, and is characterized by resistance to weathering.

The above objects are, generally, attained by providing a composition of matter which consists of an epoxy group containing interpolymer and a cross-linking substance for the interpolymer, both dispersed in a volatile inert organic dispersant. The cross-linking substance is selected to be insoluble in the dispersant at room temperatures and ineffective for cross-linking with the interpolymer at such temperatures. The interpolymer is produced by copolymerizing an ethylenically unsaturated compound selected from the group consisting of methyl, ethyl, propyl, isopropyl, butyl and isobutyl methacrylate, vinyl benzene and hydrocarbon-substituted vinyl benzene in an amount of 50 to 85 parts by weight, with 5 to 35 parts by weight of an unsaturated ester selected from the class consisting of vinyl esters of saturated hydrogen-carbon-oxygen acids and esters of saturated alkyl alcohols with unsaturated acids having the saturated group thereof containing from 2 to 18 carbon atoms, and with 1 to 20 parts by weight of a glycidyl ester of an acrylic acid.

Yet another object of the present invention is to provide a method of preparing a coating composition which will attain the above desirable characteristics and properties by performing the steps of heating 50 to 85 parts by weight of an ethylenically unsaturated compound, 5 to 35 parts by weight of an unsaturated ester selected from the class consisting of vinyl esters of saturated hydrogen-carbon-oxygen acids and esters of saturated alkyl alcohols with unsaturated acids, and 1 to 20 parts by weight of a glycidyl ester of an acrylic acid, in the presence of a polymerization catalyst of peroxide type to form an interpolymer, recovering the interpolymer, taking the interpolymer up in a volatile inert organic dispersant and adding thereto a cross-linking substance which is essentially insoluble in the dispersant at room temperature and ineffective for cross-linking with the interpolymer at such temperature.

Yet another object of the present invention is to provide an article of manufacture consisting of a metal base and a coating thereon of the cross-linked product produced by baking a mixture of an interpolymer having epoxy-containing-groups pendant to the backbone chain thereof in the presence of 1 to 20 parts by weight of a polyfunctional carboxylic compound. The interpolymer is of the type described in the preceding two objects and the carboxylic compound is from the class of citric, aconitic, tartaric, citroconic, itaconic, maleic and fumaric acids.

These and other objects of the present invention will become understood by the following description and claims in which parts and percentages are expressed by weight, based on the total solids of the composition, unless otherwise specified.

The ethylenically unsaturated component of the interpolymer may be one or more of the following vinyl compounds: methyl methacrylate, ethyl methacrylate, propyl methacrylate, isopropyl methacrylate, butyl methacrylate, isobutyl methacrylate, vinyl benzene and hydrocarbon-substituted vinyl benzene. This list of compounds conforms generally to the structural formula of:

(1) 

where Y is a phenol, tolyl or ester group having an alkyl substituted group of from 1 to 4 carbon atoms therein, and wherein R is a hydrogen radical when Y is phenyl or tolyl and is a methyl radical when Y is an ester radical.

For reasons of monomer economy, the methyl methacrylate and vinyl benzene monomers are preferred. These two monomers may be employed separately in constituting the interpolymer or together. There is no difference observed, on superfluous examination, of the interpolymer constructed with methyl methacrylate as opposed to that constructed with vinyl benzene, commonly known as styrene. The baked coat or film behaves quite similar with respect to flexibility, metal adhesion and shelf and pot life. There is some tendency, in interpolymers wherein methyl methacrylate has been used to the exclusion of styrene, for the cross-linked coating to have somewhat better weathering characteristics when exposed to atmospheric conditions.

The above list of compounds for the ethylenically unsaturated component of the interpolymer does not include methyl acrylate. This is due to the fact that when this monomer is substituted for one of the above group of monomers, a rubbery and soft film is attained which does not have the desired surface hardness and low chemical reactivity, as well as having poor impact resistance. Generalizations which have been advanced in the prior art of the equivalency of methyl acrylate to methyl methacrylate do not apply to all polymer systems as is shown by this finding.

The unsaturated ester monomer component of the interpolymer must have at least one ethylenic bond in the monomer molecule in order to copolymerize with the ethylenically unsaturated compounds set out above. The unsaturated link may be in either the alcohol portion of the ester or in the acid portion. Therewith, suitable unsaturated esters may be either vinyl esters of saturated hydrogen-carbon-oxygen acids or esters of saturated alkyl alcohols with unsaturated acids. The unsaturated ester should be such that the saturated portion thereof contains from 2 to 18 carbon atoms. The length of the saturated portion of this second monomer component is valuable for providing an internal plasticization effect in the cured thermoset polymer. The unsaturated ester may be either a mono- ester or a di-ester. For mono-esters, the following may be employed: butyl acrylate, isobutyl acrylate, ethyl hexyl acrylate, octyl acrylate, decyl acrylate, as well as the higher alkyl homologs such as stearyl acrylate. The di-ester monomers which may be employed are dioctyl maleate and dioctyl fumarate. Other dialkyl maleates and fumarates may be employed wherein the alkyl group may be from ethyl to decyl.

When the saturated portion of the ester component is the acid portion of the ester, essentially identical reactivity in forming the interpolymer is encountered.

For such unsaturated esters the following may be employed: vinyl acetate, vinyl propionate, vinyl-n-butyrate, vinyl isobutyrate, vinyl-n-valerate, vinyl isovalerate, methyl vinyl caproate, vinyl heptoate, and other higher alkyl homologs such as vinyl stearate. The acid portion of these unsaturated esters corresponds generally to the longer saturated alcohol groups of the acrylates listed above.

Ethyl hexyl acrylate is a preferred member of the useful group of unsaturated organic esters in which the unsaturation is in the acid group. The branched 8 carbon atom alkyl group provides particularly effective internal plasticizing for the interpolymer molecule when in a cross-linked state. It is representative of the other unsaturated esters listed above which all enter into the polymer structure, by action at the double bonds, and provide branch groups on the polymer in addition to the Y group of Formula 1, above. Their effect is to confer internal plasticizing branches upon the backbone of the interpolymer molecular chain, and the amount employed controls the flexibility attained in the final cross-linked product. Therewith, the 8 carbon atoms of the alcohol in ethyl hexyl acrylate have been found more effective, per unit of weight, than the 2 carbons of the ethyl or the 4 carbons of the butyl groups, respectively. The general requirement is that the branch groups have from 2 to 18 carbon atoms. This branch group is, of course, the saturated portion of the unsaturated esters, the unsaturated portion of the ester being a part of the copolymerized backbone chain of the interpolymer. The compositions of the interpolymers created by use of vinyl acetate, upon baking, exhibit the desired properties of flexibility and strength, but have a lesser resistance to aqueous substances.

A generalized formula for the above unsaturated ester component is:

(2) 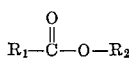

where either $R_1$ or $R_2$ has therein an unsaturated link, wherein the radical having the unsaturated link consists of an ethylenyl group and the remaining radical contains from 2 to 18 carbon atoms in straight or branched alkyl chain.

The third component of the interpolymer is a glycidyl ester of an acrylic acid. This third monomer component is a bi-functional epoxy ester of an unsaturated acid. Both glycidyl methacrylate and glycidyl acrylate may be employed with closely approximating results. Allyl glycidyl ether and glycidyl crotonate may be used to form an interpolymer of lower molecular weight which, in turn, confers a greater flexibility upon the finally cross-linked product. However, it is often desirable to use one or more of these epoxy group containing esters of an unsaturated acid together for forming the interpolymer backbone chain. This third component enters into the interpolymer chain by copolymerization through the double bond unsaturated link in the acid portion of the molecule and leaves the epoxy group containing end of the polymer as a pendant group to the main polymer backbone chain.

The controlling requirement for the third component of the interpolymer is that it have an epirane or oxirane group in one portion of the monomer and an ethylenically unsaturated bond in a second portion of the monomer and the two reactive sites being partially isolated from one another's electrical effects by an intervening oxygen atom or acyl group. Therewith, the general formulas of the third monomer component are:

(3) 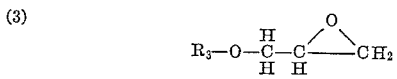

(4) 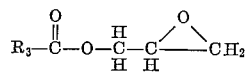

where $R_3$ is an alkenyl group having a single ethylenically unsaturated bond therein whereby monomers of the formula types (3) and (4) may enter into the backbone structure of the interpolymer. While the enumerated monomers show $R_3$ as containing from 2 to 3 carbon atoms, this number may be increased to approximately 5 carbon atoms.

The proportions of the 3 different types of monomers entering into the interpolymer structure are: 50 to 85 parts by weight of the ethylenically unsaturated compound, 5 to 35 parts by weight of the unsaturated ester, and 1 to 20 parts by weight of the glycidyl ester of an acrylic acid. The proportions set out in the examples of practice, below, may be varied within these limits to attain various desired curing rates, flexibility, impact strength, and metal wetting properties as may be desired for various employments.

Broadly described, the preparation of the interpolymer is to mix one or more of each of the above monomer components in a volatile inert organic solvent, such as methyl ethyl ketone and to then add a catalytic amount of a peroxide type catalyst. The resultant mixture is then refluxed at a temperature of approximately 80° C. for 6 to 8 hours under an inert atmosphere of, e.g., nitrogen. The resultant interpolymer may be precipitated by addition of a non-solvent such as an alcohol. Various peroxide type catalysts are employable. The benzoyl peroxide is illustrative of peroxides and per-compounds which are known to effect polymerization of ethylenically unsaturated compounds. Other organic peroxides which are useful for effecting condensation or polymerization of vinyl compounds can be employed, inclusive of cumene hydroperoxide, tertiary-butyl peroxide, tertiary-butyl perbenzoate, and methyl ethyl ketone peroxide. Azo-bisisobutyronitrile is useable.

The cross-linking substances which allow attainment of the above objects are: citric acid, as well as its hydrated and anhydrous forms, aconitic acid and tartaric. These acids are highly active to the above-described interpolymer at elevated temperatures. Due to this high reactivity, a quick curing rate can be attained by the employment of higher temperatures than are conventionally employed. The ability to utilize such higher temperatures depends, in part, upon the heat stability of these cross-linking substances at in excess of 500° F. As these cross-linking substances are continuously reacting with the epirane groups pendant on the interpolymer backbone chain as the temperature is raised, a general conclusion is that they react with the epirane oxygen groups prior to decomposition at the higher temperatures.

This higher reactivity at elevated temperatures is also present at lower temperatures and, particularly, is present at room temperature. In order to have a single mixture thermosetting component, it is necessary that this reactivity is somehow caused to assume a latent state. This is done according to the present invention by employing only those organic dispersants in which the cross-linking substance is insoluble to a great enough degree so that it is ineffective for cross-linking with the epoxy group pendant on the interpolymer backbone chain at room temperature. The interpolymer is usually soluble in the dispersant employed.

A general characteristic of these cross-linking substances is that they all contain either two carboxyl groups together with the presence of hydroxyl groups or three or more carboxyl groups or carboxyl equivalent groups. Illustrative thereof, tartaric acid contains two carboxyl and two hydroxyl groups in its meso form as well as in its racemic form, while citric acid contains three carboxylic groups with only a single hydroxyl group. The usual hydrated form of citric acid is with a single water molecule. The anhydride form of citric acid does not readily form but rather aconitic acid is formed which contains an unsaturated ethylenic link and no hydroxyl group. As there is no free radical catalyst present when the cross-linking agent is added to the interpolymer, this ethylenic unsaturation in the cross-linking agent does not affect the final properties of the polymer in a serious manner, if present in the total structure in small amounts.

The proportion of the cross-linking substance in the final thermoset product is from 1 to 10 parts by weight. Generally, a stoichiometric amount of the cross-linking substance is used based on the amount of epirane oxygen groups to be cross-linked. Therewith, the amount of cross-linking substance need only be sufficient to cure or thermoset the interpolymer present in the thermosetting composition.

It is an important feature of this invention to provide cross-linking substances for the described interpolymer which have great reactivity toward the pendant epoxy containing groups on the interpolymer so that a quick curing may be attained, but depress such reactivity in the thermosetting resin composition by providing a non-solvent for an organic dispersant in which the cross-linking substance is insoluble. A resultant feature of this invention from following the above is that the mechanical and chemical properties of the thermoset resins are extremely valuable for metal coatings.

Examples of practice of the invention are:

*Example I*

| Interpolymer components: | Parts |
|---|---|
| (1) Vinyl benzene | 65 |
| (2) Ethylhexyl acrylate | 20 |
| (3) Glycidyl methacrylate | 11 |
| Methyl ethyl ketone (solvent), ml. | 250 |
| Benzoyl peroxide | 1 |

The above components were used to prepare the interpolymer in the following manner: The vinyl benzene and ethylhexyl acrylate were first added to the solvent and thereafter the glycidyl methacrylate and benzoyl peroxide were added with stirring. The mixture was further stirred and refluxed at a temperature of 80° C. for 6 to 8 hours under an inert atmosphere of, e.g., nitrogen. Following the chain reaction, the interpolymer was recovered by precipitation resulting from adding ethanol and washing therewith for purification. The interpolymer was then dispersed in xylene and 5 parts by weight of citric acid were added by milling. The cross-linking substance, citric acid, is insoluble at room temperature in xylene, as well as other aromatic solvents, which are representative of low polar solvents. This low solubility or insolubility is sufficient to prevent cross-linking at room temperature; therefore, the thermoset composition of the interpolymer, cross-linking acid, and organic dispersant does not gel or set up at room temperatures and may be stored for long periods of time prior to use. Also, the thermosetting mixture may be placed in an applicator device and heated only after coated to a metal substrate by either forced air ovens or flame curing ovens.

The milled thermosetting mixture was then baked at an elevated temperature for a time sufficient to cause the acid to react at the epoxy groups to effect cross-linking. The baking temperature can be from 375 to 415° F., with an inverse time function of 12 to 8 minutes. High speed curing can be effected by exposure to 700 to 900 degrees for a few seconds. At temperatures below about 500° F., prolongation of the baking time does not appear to cause deterioration.

The thermoset resin coating upon its metal substrate showed exceptionally good flexibility and did not crack and peel from the metal substrate when metal containers were fabricated therefrom. The coating is of low extractability with common organic solvents and has a smooth clear finish.

In order to test the ability of this thermosetting resin system to take pigment, a portion of the milled mixture was set aside and milled with titanium dioxide, rutile. Following the baking the sample after cooling down had a glossy surface and was still highly flexible and did not crack and peel from the underlying metal substrate upon fabrication into metal container parts. Thus, this thermosetting resin system is of particular utility in that it can be employed as a useful vehicle for pigmented enamel or dyes.

The pigmented thermoset coating showed approximately the same extractability and flexibility together with the same metal adhesion properties as the clear coating. This thermoset composition had great shelf life and pot life prior to use. A preferred form of this invention is to bring the interpolymer into solution with a volatile inert organic solvent, for a desired viscosity, and then add the cross-linking substance. This cross-linker material is chosen to be insoluble in the organic dispersant employed and can be added simultaneously with the addition of the pigment; thereafter, the materials are milled together and are then ready for storage and, later, application. Citric, aconitic and tartaric have very low solubilities in low polar solvents or dispersants at room temperatures; and, hence, the milled interpolymer and any one of these cross-linking substances has a very long commercial pot life in aromatic solvents.

*Example II*

| Interpolymer components: | Parts |
|---|---|
| (1) Vinyl benzene | 130 |
| (2) Ethylhexyl acrylate | 40 |
| (3) Glycidyl acrylate | 20 |
| Xylene (solvent) | 60 |
| t-butyl peroxide | 3.8 |

A 500 milliliter flask was equipped with a stirrer, a reflux condenser, a gas inlet tube, and a dropping funnel. Sixty grams of xylene was introduced and nitrogen supplied to expel oxygen. The xylene was then heated to reflux temperature (140° C.). A liquid mixture of 130 grams of vinyl benzene, 40 grams of ethylhexyl acrylate, 20 grams of glycidyl acrylate, and 3.8 grams of tertiary-butyl peroxide was then passed into the fluxing liquid, slowly over a period of one and one-half hours. Refluxing was continued for another one and one-half hours. The solution of polymer was cooled; at this stage it has an essentially infinite shelf life. The yield is about 190 grams of the polymer.

For use, the resin can be divided into two portions to be used either as a clear varnish or as a pigment coating. Thus, the quantity of polymer solution produced above can be divided into two portions, each having 95 grams of the resin (100% non-volatile matter) in about 30 grams of xylene. To the first portion was added 146.2 grams of volatile hydrocarbon liquid which is a mixture of aliphatic and aromatic solvents, for example, 95% can be aromatics as in the commercial material known by the trademark "Solvesso-150" which has been found satisfactory. A dispersion of 4.95 grams of hydrous citric acid dispersed in 14.85 grams of "Solvesso-150" is mixed with the diluted first portion. The second portion was blended with 95 grams of titanium oxide (rutile), 4.95 grams of hydrous citric acid, and 68 grams of the above aliphatic-aromatic solvent; the mixture was milled on a 3-roll mill until the pigment particles were of the desired size. Each material can then be put to its respective use, the first case as an unpigmented coating and the second case as a white coating. These liquid coating compositions can be applied to metal, e.g., tinplate or blackplate, and baked as in Example 1. When used as an unpigmented coating, the material is translucent prior to curing and after the curing upon the metal substrate, it is essentially clear.

The vinyl benzene or simple styrene of Examples I and II is illustrative of the class of aromatic hydro-carbons having a vinyl group and herein termed styrenes. Other hydrocarbon groups may be present in the molecule, such as in vinyl toluene or methyl styrene.

The thermoset metal coating compositions prepared according to Examples I and II had a high resistance to solvents, steam and foodstuff components; and were essentially without flavor effect upon foodstuffs; and tolerant to severe distortion by bending of the metal substrate. The samples prepared could be fabricated with bending or drawing to form container bodies and ends.

*Example III*

The terpolymer of the Example II was prepared in the same manner as described above and then divided into two portions in the manner of that example. The first portion contained approximately 95 grams of the interpolymer (100% non-volatile matter) in about 30 grams of xylene. To this portion was added 146.2 grams of volatile hydrocarbon liquid, as in the above example. The coating material is prepared by adding 4.95 grams of tartaric acid dispersed in 16.9 grams of xylene.

A second portion of the interpolymer is blended with 95 grams of titanium oxide (rutile), 4.95 grams of tartaric acid, and 68 grams of an aliphatic-aromatic solvent. Thereafter, the mixture is milled on a 3-roll mill until the pigment particles are of the desired size.

Each of these thermosetting compositions is then used to coat a metal substrate and to thereafter form a baked thermoset coating by the heating step. These specimens show tests and properties similar to those described for Examples I and II.

*Example IV*

Similar specimens to those of the above example are made up by employing the terpolymer of Example II with aconitic acid. The resulting properties of the baked thermoset coating and of the thermosetting composition prior to baking are similar to those above described.

*Example V*

| Interpolymer components: | Parts |
|---|---|
| (1) Methyl methacrylate | 70 |
| (2) 2-ethylhexyl acrylate | 20 |
| (3) Glycidyl acrylate | 10 |
| Xylene (solvent) | 60 |
| Benzoyl peroxide | 1 |

The three monomer components set out were reacted together in the xylene solvent in the presence of the benzoyl peroxide in the manner of Examples I and II, above. These terpolymers were then suspended in a suitable dispersant and milled together with a cross-linking amount of citric acid and a pigment material (titanium oxide). The quantity of citric acid used was approximately 5 grams, this amount being stoichiometrically calculated, based upon the presence of epoxy oxygen groups in the interpolymer. The thermosetting composition formed was then used to form a thermoset coating upon a metal substrate. Superficially, examination showed essentially the same coating as by any of the above examples. The coating application behavior was quite similar and the solubilities were similar. The physical data with respect to flexibility, metal adhesion, shelf life, and pot life are all very similar to the above specimen. This specimen tended to have a somewhat greater resistance to weathering under outdoor exposures than the several above specimens. However, this difference is discernible only after long exposure times and is not deemed critical for most commercial applications.

*Example VI*

| Interpolymer components: | Parts |
|---|---|
| (1) Vinyl toluene | 34.2 |
| Methyl methacrylate | 34.2 |
| (2) 2-ethylhexyl acrylate | 21.2 |
| (3) Glycidyl acrylate | 10.0 |

In this example of practice, two monomers were used as a mixture for the first component of the interpolymer. As shown above, both vinyl toluene and methyl methacrylate were employed as the ethylenically unsaturated compound having the molecular type of Formula 1, above. These components were used to manufacture an interpolymer in the manner of Example II and then milled with citric acid for a cross-linking agent and with titanium oxide for a pigment. The thermosetting composition showed similar shelf and pot life to the above specimens. The thermoset coating upon a metal substrate showed essentially the same properties as has been previously described.

A substitution of vinyl toluene for a portion of the methyl methacrylate of Example V is seen by this example to involve little change in the chemical or physical properties of the resultant compositions.

*Example VII*

| Interpolymer components: | Parts |
|---|---|
| (1) Vinyl benzene | 40 |
| Methyl methacrylate | 40 |
| (2) Stearyl methacrylate | 10 |
| (3) Glycidyl acrylate | 10 |

In this example the proportion of component (1) has been raised and the proportion of component (2) lowered by approximately the same amount, from the preceding example. This interpolymer was prepared in the same manner as the preceding example and then cross-linked in the presence of a pigment as in that same example. This practice also illustrates that both vinyl benzene and vinyl toluene can be used with equivalent results.

The presence of the longer alkyl group in the interpolymer as a result of the copolymerization of monomer (2) into the backbone chain gave this specimen slightly increased flexibility over the above example, but in other respects the coating was similar in all chemical and physical aspects.

*Example VIII*

| Interpolymer components: | Parts |
|---|---|
| (1) Vinyl toluene | 57.2 |
| (2) Methyl methacrylate | 28.6 |
| (3) Glycidyl acrylate | 14.2 |

In this example the second component utilized was methyl methacrylate, which contributes only a methyl group, together with its associated acyl group, as a branch group off of the interpolymer chain. This interpolymer was formed in the manner of Example I and then milled with citric acid and titanium oxide to form the thermosetting composition. This non-cross-linked composition showed identical shelf and pot life to that of the above samples. Upon baking, however, this composition produced a brittle coating which was unsatisfactory for certain fabrication employments. This demonstrates that a greater degree of internal plasticization is necessary to form truly flexible coatings in this resin system. A minimum flexibility property for many fabrication employments is attained when ethyl acrylate is substituted for the number (2) component of this example.

Specimens of the several thermoset coatings deposited upon metal substrates which were pigmented with titanium oxide were exposed for a one year weathering test in the vicinity of Miami, Florida. This test is considered one of the most rigorous actual weathering condition tests due to the long time involved and the great amount of sunlight present as well as to the high humidity during the testing period. No loss in the glossiness of the surface appearance or other decoration of the thermoset coatings was noticed. That is, the glossimeter values before and after exposure to the weathering conditions were essentially equivalent. The only possible explanation advanced for this superior and unexpected weathering property of the compositions of the present invention is that the particular components from which the thermosetting composition is manufactured when combined in the cured state represent a particularly stable three dimensional structure.

The unpigmented, clear, coatings have a similar unexpected resistance to weathering conditions and are hence useful for outdoor application where various surfaces are desired to be protected, but not covered by decorative matter.

*Example IX*

In order to compare the cross-linking substances of the present invention with other cross-linking agents which have been used for epoxy-reactive polymers, a similar interpolymer was made up and tested with two different types of cross-linking acids. Citric acid was used as a cross-linking agent, according to the present invention. Whereas, the second portion of the interpolymer was cross-linked with azelaic acid, it being a common dibasic acid.

The terpolymer for cross-linking with the citric acid, according to the present invention, was formed of the following three components: vinyl benzene (68.5 parts), ethyl hexyl acrylate (20 parts), and glycidyl acrylate (11.5 parts). The copolymerization was carried out as in Example II, above, whereby the mixture of monomers in xylene at 138–140° C. was stirred while two parts by weight of t-butyl peroxide was added, dropwise, over a period of one and one-half hours, followed by the additional heating for another hour. The copolymerization conversion was 100%. This interpolymer was then milled with a stoichiometric quantity of citric acid together with a titanium oxide pigment as in the above examples. The thermosetting composition was of long shelf and pot life and the coating showed all of the favorable properties, upon baking, as the above specimens.

The polymer for cross-linking with azelaic acid was prepared by adding the following monomers to 100 parts of methyl ethyl ketone and 3 parts of benzoyl peroxide in an agitated vessel: vinyl benzene (60 parts), ethyl acrylate (20 parts), and glycidyl methacrylate (20 parts). This polymer was formed by heating and maintaining a temperature of 70° C. for a period of 20 hours with constant agitation. Thereafter, the solution was cooled. Twenty parts of azelaic acid were then blended into the polymer mixture to form the thermosetting composition. At the same time, titanium oxide (rutile) was added in the same proportion as in the above thermosetting composition according to this example of practice. This mixture slowly gelled as a curing was noted by identifying a thickening at the room temperatures which were employed in mixing the composition up. Consequently, this composition showed low shelf life, as well as pot life. It was necessary when dealing with this system of azelaic acid in the methyl ethyl ketone to mix it just prior to coating. The thermoset coating when baked out upon a metal substrate was dull and chalky and showed a pronounced tendency to be thixotropic. There was no glossy characteristic to the surface, hence, indicating that this formulation is not useful in pigmented coatings. This lack of surface gloss is thought to be due to some interaction between the titanium dioxide and the dissolved acid, whereas no such interaction occurs when the acid component is insoluble.

In order to better determine this loss of glossiness and to have a measure thereof, glossimeter (Gardner Laboratory) readings were taken according to ASTM procedure D523–53T at 20° angle of light. The readings were taken upon eight individually prepared samples of each of the resin systems according to Example IX. The results are set out in Table I and show that, uniformly, the compositions containing the azelaic acid have a flat and dull surface appearance compared to the undissolved cross-linking agents of the present invention.

TABLE I.—GLOSSIMETER VALUES

| Sample | Citric Acid Composition | Azelaic Acid Composition |
|---|---|---|
| 1 | 42.1 | 1.5 |
| 2 | 63.0 | 1.5 |
| 3 | 63.3 | 1.8 |
| 4 | 68.6 | 1.7 |
| 5 | 59.0 | 1.7 |
| 6 | 58.6 | 1.6 |
| 7 | 62.6 | 1.6 |
| 8 | 66.0 | 1.7 |

While the prior art has generally treated the acid cross-linking agents as equivalent to their respective anhydride or di-anhydride forms, it has been found that for the present invention functional differences exist. The anhydride and di-anhydride forms of the various acidic cross-linking material set out above are generally soluble to a slight extent in both aromatic solvents, e.g., xylene and the various ketones, e.g. methyl ethyl ketone. Thus, both phthalic anhydride and succinic anhydride are slightly soluble in the dispersant and interpolymer systems in which their corresponding acids are totally insoluble. This slight solubility of the anhydride and dianhydride forms is great enough to permit curing at room temperature in a time period of several weeks. Such anhydride and dianhydride forms have a solubility greater than 1 part in 10,000 parts of dispersant and interpolymer solution, by which the slow curing or setting at room temperature occurs. Once the solubilized anhydride or dianhydride cross-linking agent reacts with the interpolymer, more of the relatively insoluble cross-linking agent then goes into solution by mass action equilibrium. Thus, the anhydrides and dianhydrides are useful only where immediate use of the resulting thermosetting composition can be assured. Most commercial applications, and particularly storing and shipping, cannot be conducted under such conditions.

Generally, it is desirable to use low-polar solvents which are characterized by being non-oxygen or halogen bearing. Such solvents are generally referred to as aromatic solvents. Therewith, benzene, toluene, xylene, ethyl benzene, cumene, the naphthalene derivatives, e.g., tetrahydro naphthalene (tetralin), commercial mixed aromatic solvents, e.g., commercially sold under trade names "Solvesso" or "Panasol," and other similar type dispersants are of sufficiently low polarity to prevent the acid cross-linking agents from becoming soluble at room temperature. The term "dispersant" is employed rather than the word "solvent" due to the fact that the acid cross-linking agent is not soluble in such media. Other commonly employed solvent materials may be present in low percentages of from 1 to 5% by weight of the total dispersant. Generally, such other materials are diluents and are compatible with the low polar dispersants. Such materials as isophorone and cyclohexanone, as well as other higher ketones, can be present in such low amounts as diluents. Likewise, various esters, such as dimethyl phthalate, dibutyl sebacate, and butyl acetate may be present in small amounts as diluents. Also, ethers such as butyl cellosolve acetate and methyl cellosolve acetate are useful as diluents. Hence, the presence of other more highly polar substances in small amounts has not been found detrimental to the desired insolubility of the acid cross-linking components.

Due to the wide range of low polar dispersants set out above, various boiling point ranges of the dispersant and, hence, of the thermosetting composition, can be attained. The variation of the boiling point of the solvent is useful in making up the theromsetting composition for various employments such as spraying or roll coating, the various employments of which require varying viscosities at elevated temperatures. Another diluent which is useful for so varying the boiling point of the mixture is the addition of small quantities of commonly employed aliphatic solvents, e.g., hexane and heptane. Such are useful in approximately diluent amounts, as set out above.

In the claims, the term "aromatic diluent" defines such low polar non-oxygen or halogen bearing diluents as set out above.

Generally, any dispersant system which maintains the cross-linking substance in an insoluble state may be used. The invention is not intended to be limited to the specific diluents set out above as many other low polar solvents, generally more expensive in the present market, are available.

While not limiting the interpretation of the claimed subject matter by the efficacy of any particular theory or theories, a plausible explanation for the behavior of the thermosetting composition under elevated temperatures and its subsequent curing to a thermosetting resin is the following. As the thermosetting composition containing the interpolymer bearing the epoxy groups, the insoluble cross-linking substance, and the dispersant is heated to an elevated temperature during the short curing time, two simultaneous actions occur. The acid cross-linking substance begins to go into solution in the dispersant at the elevated temperature and the cross-linking substance is carried closer to its melting point whereby greater mobility of the individual molecules or greater transport is effected for bringing the cross-linking molecules into reactive positions by reason of the greater kinetic energy. By way of illustration, citric acid in its ordinary form has a melting point of 307° F. Thus, in heating the thermosetting mixture to temperatures greater than this melting point, the cross-linking substance is molten and, therefore, extremely mobile and able to move into reactive sites for reacting with the epoxy groups on the interpolymer backbone chain. Generally, temperatures in excess of 307° F. are employed, as stated above.

While citric acid is believed to react due to its molten condition at the curing temperatures, other of the cross-linking substances set out above are believed to react due to their increased solubility at the curing temperatures as their melting points are sufficiently high that the curing temperautres should not effect great mobility. Thus, no clear demarkation between the effect of increased solubility and the effect of increased mobility at the curing temperatures can be set out for the individual cross-linking substances, rather the effect is believed due to both actions occurring simultaneously. Some degree of control in the curing can be attained by selecting the cross-linking substance used so that its melting point is either exceeded at the curing temperature or greater than the curing temperature, depending upon the final use for the thermosetting composition.

Another effect of the insolubility of the cross-linking substance in the dispersant and interpolymer solution which likewise appears plausible is presented when a particle pigment is employed. Many of such pigmenting materials are basic in nature. Thus, titanium dioxide (rutile), red lead, zinc oxide and other metallic oxides, which are the most commonly employed pigments, all have a basic characteristic. If the acidic cross-linking substance is soluble in the dispersing medium or the "solvent," a neutralizing interaction is believed to occur between the two components of the thermosetting composition. Thus, in the prior art when soluble cross-linking substances were employed, great difficulty was encountered due to this neutralizing interaction whereby clear, smooth or glossy surfaces of pigmented thermosetting coatings could not be obtained. Thus, the insolubility feature of the present thermosetting composition is desirable not only from a commercial and use standpoint but also from a chemical standpoint of attaining the most desirable end product. In Example IX, above, the soluble cross-linking agent, together with the pigment, is stated to produce a chalky and thixotropic coating, which is illustrative of one of the observations giving grounds for this possibility. Thus, the particular thermosetting composition of the present invention has primary utility for pigmented coatings by which thermoset layers can be deposited which have smooth and glossy surfaces and are otherwise mechanically stable against abrasion, flexing of the substrate and chemical agents.

In the claims the term "insoluble" is intended to define a solubility of the stated component below one part per 10,000 parts of dispersant.

In the drawing, a metal sheet 10 provides a base, and the coating 11 thereon is baked product of the coating composition prepared according to the present invention.

It is obvious that the illustrative practices of this invention are not restrictive; and that the invention can be practiced in many ways within the scope of the appended claimed subject matter.

We claim:
1. A curable coating composition having a long pot life which comprises an effective amount of an interpolymer and a dispersion of a cross-linking agent in a volatile-inert organic solvent;
   said interpolymer consisting essentially of the reaction product of 50 to 85 parts by weight of at least one ethylenically unsaturated compound selected from the group consisting of methyl methacrylate, ethyl methacrylate, propyl methacrylate, isopropyl methacrylate, butyl methacrylate, isobutyl methacrylate, vinylbenzene and hydrocarbon-substituted vinylbenzenes;
   about 5 to 35 parts by weight of at least one unsaturated ester selected from the group consisting of vinyl esters of saturated monocarboxylic acids containing 2 to 18 carbon atoms per molecule, alkyl esters of acrylic and methacrylic acids wherein the alkyl group is saturated and contains from 2 to 18 carbon atoms, and dialkyl esters of unsaturated dicarboxylic acids wherein the alkyl groups contain from 2 to 10 carbon atoms; and
   about 1 to 20 parts by weight of a glycidyl compound selected from the group consisting of glycidyl ethers of unsaturated alcohols having 2 to 3 carbon atoms, and glycidyl esters of methacrylic and acrylic acid;
   said cross-linking agent being present as a dispersion in a stoichiometric amount based on the epirane oxygen groups present in the glycidyl compound and selected from the group consisting of citric acid, aconitic acid, tartaric acid, citraconic acid, itaconic acid, maleic acid and fumaric acid; said cross-linking agent being insoluble in the inert organic solvent and substantially non-reactive at about room temperatures.

2. The coating composition of claim 1 further characterized in that the cross-linking agent is citric acid.

3. The coating composition of claim 1 further characterized in that the cross-linking agent is aconitic acid.

4. The coating composition of claim 1 further characterized in that the cross-linking agent is tartaric acid.

5. The coating composition of claim 1 further characterized in that the ethylenically unsaturated compound is methyl methacrylate.

6. The coating composition of claim 1 further characterized in that the ethylenically unsaturated compound is ethyl methacrylate.

7. The coating composition of claim 1 further characterized in that the ethylenically unsaturated compound is propyl methacrylate.

8. The coating composition of claim 1 further characterized in that the ethylenically unsaturated compound is butyl methacrylate.

9. The coating composition of claim 1 further characterized in that the ethylincally unsaturated compound is vinylbenzene.

10. The coating composition of claim 1 further characterized in that the ethylenically unsaturated compound is a hydrocarbon-substituted vinylbenzene.

11. The coating composition of claim 1 further characterized in that the unsaturated ester is a vinyl ester of a saturated monocarboxylic acid.

12. The coating composition of claim 1 further characterized in that the unsaturated ester is an ester of acrylic acid wherein the saturated group of the ester contains 2 to 18 carbon atoms per molecule.

13. The coating composition of claim 1 further characterized in that the unsaturated ester is an ester of an unsaturated dicarboxylic acid.

14. The coating composition of claim 1 further characterized in that the cross-linking agent is present in an amount ranging from about 1 to 10 parts by weight.

References Cited by the Examiner
UNITED STATES PATENTS

| | | | |
|---|---|---|---|
| 2,781,335 | 6/1952 | Cupery | 260—86.1 |
| 2,994,670 | 8/1961 | D'Alelio | 260—78.4 |
| 3,058,947 | 10/1962 | Fryling et al. | 260—78.4 |

JOSEPH L. SCHOFER, *Primary Examiner.*

L. WOLF, *Assistant Examiner.*